United States Patent
Brosow

[11] 3,784,968
[45] Jan. 8, 1974

[54] NAVIGATION SYSTEM

[76] Inventor: Jorgen Brosow, Hackspettragen 13, Bromma, Sweden

[22] Filed: May 27, 1971

[21] Appl. No.: 147,410

[30] Foreign Application Priority Data
May 29, 1970 Sweden............................... 7415/70

[52] U.S. Cl................ 340/25, 244/114, 343/108 M
[51] Int. Cl............................................... G08g 5/00
[58] Field of Search................ 340/22, 25, 26, 27 R, 340/27 AT, 28, 27 NA; 250/199; 331/94.5 A; 343/108 R, 108 M, 5 LS; 240/1.2; 356/152; 350/7, 99, 100; 244/114

[56] References Cited
UNITED STATES PATENTS

| 3,710,098 | 1/1973 | Walden................................. 340/25 |
| 3,671,963 | 6/1972 | Assouline et al............... 340/27 NA |
| 3,657,792 | 4/1972 | Hug et al................................ 350/7 |
| 3,648,229 | 3/1972 | Burrows et al........................ 340/26 |
| 3,370,269 | 2/1968 | Jasper................................... 340/22 |
| 3,527,949 | 9/1970 | Huth et al............................ 250/199 |
| 3,447,129 | 5/1969 | Birmingham et al. ................ 340/26 |
| 3,293,438 | 12/1966 | Davis, Jr............................. 250/199 |
| 3,279,406 | 10/1966 | Ricketts et al........................ 340/26 |
| 3,227,882 | 1/1966 | Bissett et al. ........................ 250/199 |
| 3,139,604 | 6/1964 | Meiners et al........................ 340/25 |
| 3,138,779 | 6/1964 | Murray, Jr. et al................... 340/25 |
| 2,989,727 | 6/1961 | Germeshausen...................... 340/26 |

Primary Examiner—William C. Cooper
Assistant Examiner—Randall P. Myers
Attorney—Hammond and Littell

[57] ABSTRACT

A navigation system for determining on board a moving craft the position of the moving craft in relation to a fixed station which is provided with visual means for guiding said moving craft wherein there are means on said station for visible said visual means to the navigator of said moving craft by means of laser beams.

2 Claims, 5 Drawing Figures

NAVIGATION SYSTEM

THE FIELD OF THE INVENTION

The present invention relates to a navigation system for determining on board a moving craft the position of said moving craft relative to a fixed station equipped with visual means for guiding the moving craft. The object of the invention is to improve the reliability of such systems, particularly during the approach and landing of moving craft on such runways which (in each particular instance) are marked by runways indication devices positioned remote from and close to the runway. The system of the invention renders unnecessary the use of such illuminating devices as floodlights etc. and provides for a longer viewing range than previous navigation systems, particularly in bad weather conditions. Furthermore, the navigation system of the present invention renders discovery of airfields and landing strips by pilots of aircraft other than those to be accomodated thereon more difficult.

A navigation system of the present invention is mainly characterized by means arranged on the fixed station for making visible to the navigator of the move craft by means of laser means the visual guiding means arranged on said station. These means include reflecting screens which, when practicing the invention, become sequentially visible to the pilot of an aircraft, for example, to enable a safe landing to be made on a specific runway of an airfield. The laser beams can be swept in the vertical plane to render the screens visible from the level of the ground up to a certain upper limit height angle. Other series of laser beams can be used which sweep in the horizontal plane within a determined sector. The beams can be swept at a uniform speed, either with an intermittent movement or with a reciprocating movement, optionally with a reciprocating movement of small angular amplitude superposed on a smooth movement. For the sake of safety, it is suitable that the beams are only active within the angular regions required in each particular instance. The screens are erected one behind the other at suitable intervals, preferably in a straight line. The screens are also provided with means for regulating the reflection angle of the reflected beams, for example when the laser beams are swept vertically, so that said angle is the same for all screens and coincides with the aforementioned limit height angle. Each screen may be in the form of a box provided with a perforated front wall to enable the laser beams to penetrate therethrough and impinge on individual, adjustable reflecting devices arranged in the box behind respective apertures. The laser beams are swept by means of rotating or rocking prisms or mirrors arranged in the lasers and the beams are dimmed in a manner whereby the projected beams are in the form of strips of light. If several lasers ar used, they may be arranged so that laser beams of different colors are obtained. In this way it is possible to obtain a series of screens which is acted upon by a laser which radiates a certain color, while one or more other series of screens are acted upon by beams of one or more other colors. This is a suitable expedient if the screens are to indicate boundaries for different ground areas.

If the navigation system is to be used to facilitate the landing of an aircraft, a first series of screens may be used to mark the approach line of the runway with one particular color, for example yellow, and another series of screens positioned to the left of said first series and a further series of screens positioned to th right of the first series with the screens placed along left and right, suitably converging lines may be used to indicated the boundaries of an interception sector or an approach sector tapering in towards the runway.

To enable coded information to be transmitted from the field station to, for example, an approaching aircraft, the laser beams can be reflected as reflex modulated beam from their source.

The invention will now be described in more detail with reference to an embodiment thereof illustrated in the accompanying drawings.

Figure 1:
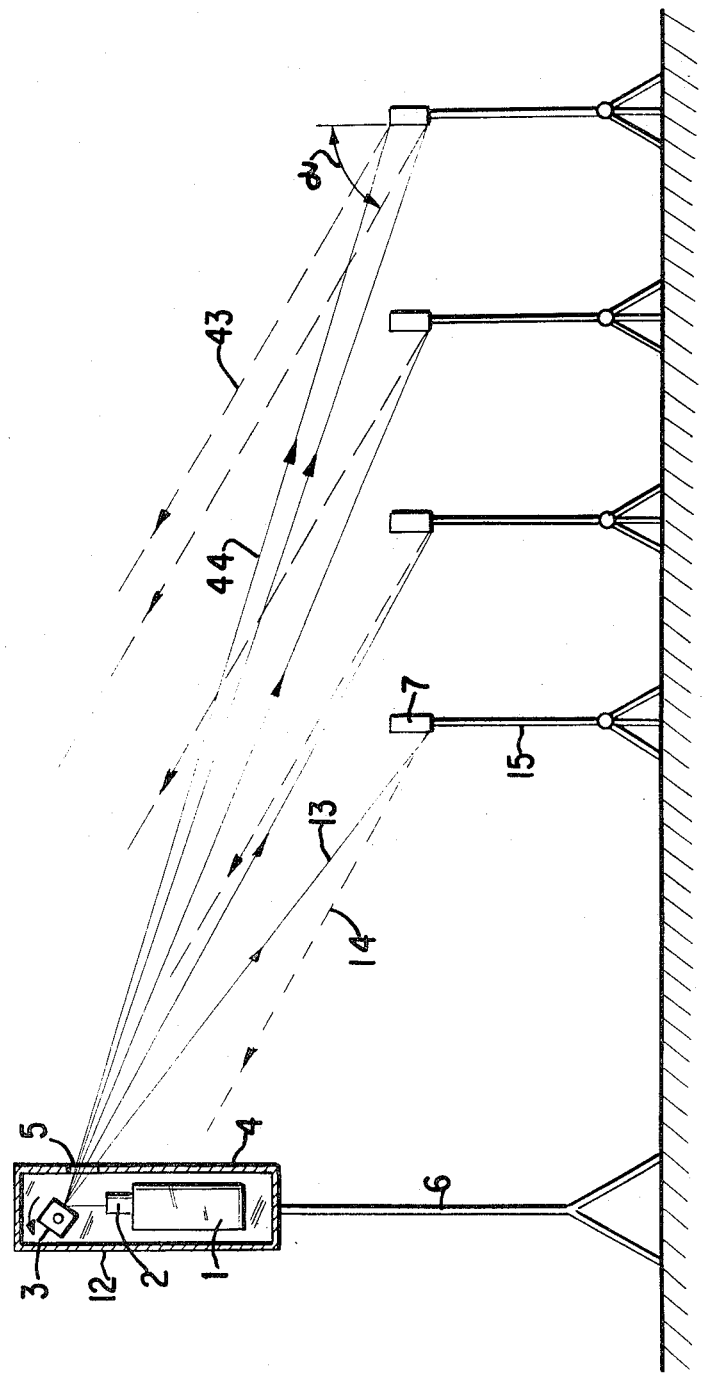
FIG. 1 is a diagrammatic, greatly compressed side view of an embodiment of a navigation system for guiding aircraft to the runway of an airfield.

In the embodiment of FIG. 1, laser beams are generated from a laser 1 situated within a housing 4 having a departure opening 5 for a laser beam 13. Laser beams from the laser 1 are dispersed through a lens 2 and reflected by a rotating prism or mirror 3, which is rotated in the direction of arrow 12, and pass through the opening 5, which is of such configuration that a strip-like beam 13 is projected towards a series of screens 7. In the illustrated embodiment the screens 7 are positioned one behind the other along a straight line. The reference numerals 6 and 15 indicate an upright and a frame structure for the housing 4 and the screens 7 respectively. The screens are box-shaped (as is best seen from FIG. 3) and are arranged at a level above the ground higher than the height of a man. The angle of the screens can be adjusted in relation to the surface of the ground and in the illustrated embodiment the screens are of the same height. The beams 13 are projected from a point which is considerably higher than the screens 7. A conceivable distance between the screens is 50 meters. The beam 13 is swept from the bottom of the screen upwardly and impinges on the screens 7 in sequence, from the front screen and moving rearwardly, and can make the screens visible either one at a time or several at once. If the beam 13 is also used to transmit information, it can suitably be caused to remain still momentarily on, for example, the last screen. The angle $\alpha$ is the reflection angle, i.e., the maximum height angle above which the screens are not visible to an approaching aircraft. The angle $\alpha$ is set equal for all screens 7, whereas the angles of incidence will naturally be different for the individual screens. The reflecting beam is indicated by the reference numeral 14. It will be understood that although several beam paths are shown on the drawing, these need not necessarily all be present at the same time, but that the beam paths indicated by the reference numerals 13 and 14 may be the only beams present at a certain moment and that said beams, during the sweep, successively adopt the illustrated positions up to boundary positions for the reflected beam 43. In the illustrated embodiment, the incident beam is restricted by the upper and lower edge surface of the opening 5 and is caused to be projected within the area between the beams 13 and 44, while the reflected beam is maintained within the boundaries defined by the beams 14 and 43.

Figure 2:
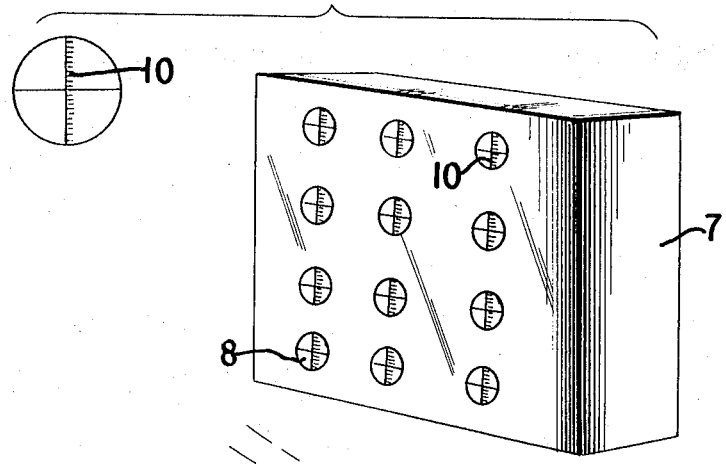
FIGS. 2 and 3 show in perspective and in section a reflecting screen in the form of a box.
Figure 3:
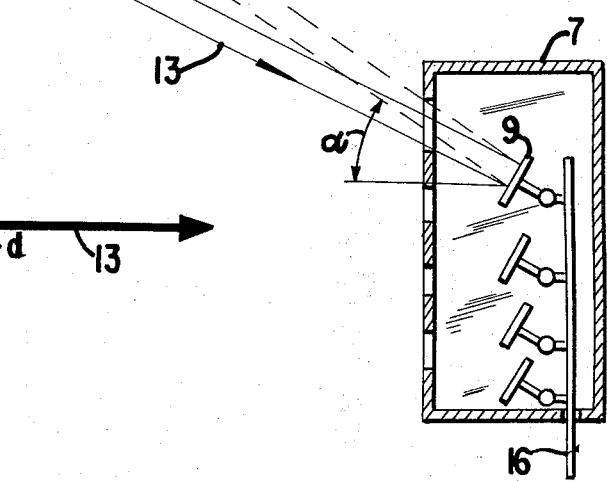

As is evident, the capacity to make of the reflected beams visible is restricted to the angle of elevation $\alpha$ and that consequently the screens 7 are not visible to aircraft flying in an area above said angle. It has been assumed in the aforegoing that the beam is swept smoothly towards the screens from the bottom thereof upwards, optionally with a certain stationary period at the last screen. However, the sweeping movement can be superposed with an oscillating movement or fluttering movement effected by means of such a movement caused by the prism 3 for example. Furthermore, the beam may be caused to remain for a specific length of time on each screen, or a stationary beam may be fixedly directed against the last screen 7. One embodiment of a screen is illustrated in FIGS. 2 and 3.

Other screen designs, for example screens in the form of a grid, may be suitable in certain cases, e.g., to prevent the reflection ability of the screens from being reduced by adhering snow.

The illustrated screen 7 is box-shaped, having aperture 8 disposed in the end wall thereof facing the laser. In the embodiment illustrated in FIG. 3, each aperture cooperates with an individual mirror 9, which can be adjusted by means of an actuator 16 and a sighting scale 10 located in the aperture 8 for setting the reflection angle $\alpha$. The incident beam is identified by the reference numeral 13 and the reflecting beam by the reference numeral 14, as in FIG. 1.

Figure 4:
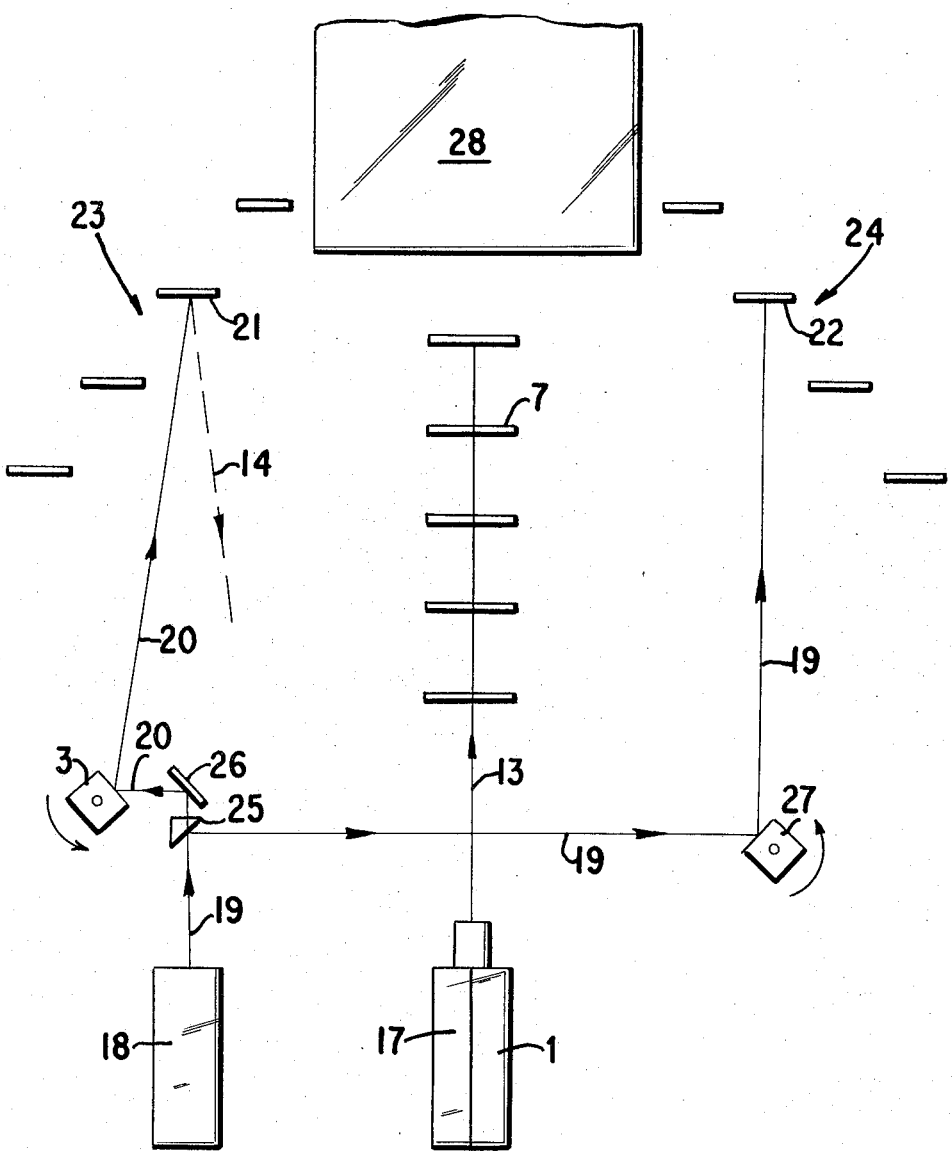
FIG. 4 is a top plan view of a landing navigation system constructed in accordance with the invention for indicating the direction of approach to the aircraft and also showing the boundaries of a permitted approach area, for the purpose of directing aircraft from remote distances to the screens which mark the approach direction.

FIG. 4 is a top plan view of a more complicated aircraft approach system. It is emphasied that this embodiment is concerned with the close approach of the aircraft at the landing stage and that direction of aircraft at remote distances is effected in a conventional manner, e.g., with the assistance of radio. The illustrated system replaces conventional light beams and landing lights normally found in airfield navigational systems.

A runway 28 is provided with a number of screens 7, which mark the center line of the runway. When sweeping the beam 13 vertically, these markings becomes visible to aircraft located within the range of the reflected beams, but only if the aircraft is flying beneath the elevation angle limit $\alpha$. These markings are, on the other hand, not visible from a point of observation directly above the same. Because of this and because the laser beams are not illuminated until the approaching aircraft is ready to land, the possibility of the airfield being discovered by enemy aircraft, for example, is considerably reduced, which plays an important part in times of war. Furthermore, the effect of the laser beams is not influenced by poor weather conditions such as fog. As previously mentioned, the screens 7 are acted upon by the beam 13 from the laser, which is a composite laser having a green radiating portion 1 and a red radiating portion 17, wherewith these colors are combined to form a yellow beam 13. Consequently, the center line of the runway is marked by yellow reflecting beams.

To the left of the laser 1, 17 in the drawing is a blue radiating laser 18, the beam 19 of which is divided by a prism 25 into a through-passing beam 20 and a beam 19 which is reflected towards a rotating mirror 3 by a mirror 26, the mirror 3 operating as previously described to sweep over a series 23 of reflection-dependent screens 21 situated to the left of the screens 7 in figure. The screens 21 are arranged along a line inclined to the path 28, whereby a sector between the series 23 and the screens 7 is marked with a blue color.

The beam 19 reflected through 90° is projected against a rotating prism 27, which in turn reflects the beam 19 towards a series 24 of screens 22 situated to the right in the drawing. The series 22 is arranged to function analogously with the lefthand series 23. The final result is a blue approach sector which tapers towards the runway and which is visible at greater distances than the beams from the screens 7.

Other colors can be used to obtain starboard and port marking of the approach sector, e.g., red and green marking. In the illustrated embodiment either one or both of the vertically or horizontally swept beams may have a superposed fluttering movement, while in other respects the aforementioned intermittent sweep may also be used.

One example of the manner in which a sweep can be effected is one in which one sweep is made per second, i.e., the laser beam is able to activate during this period all screens, for example 20, in 1 second, which means that each screen is illuminated for 50 milliseconds.

Figure 5:
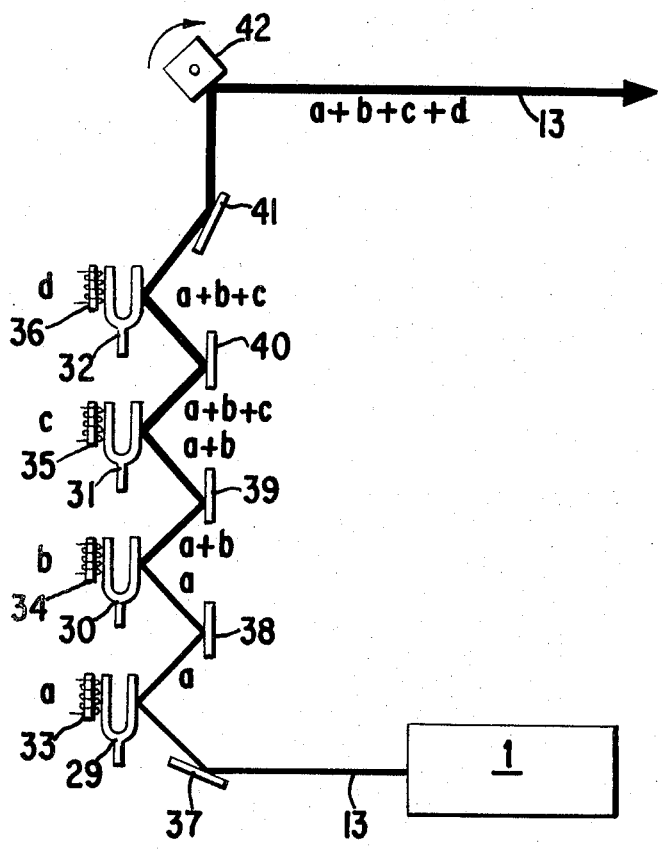
FIG. 5 illustrates a code modulation system embodied in the navigation system of the present invention.

FIG. 5 illustrates an example for a communication system for coded communication between the ground station and the approaching aircraft.

A laser 1 projects a beam 13 against a mirror 37. The mirror projects the beam against a tuning fork 37 oscillated, for example, by the oscillator 33 and provided, for example, with a hard chromium reflecting surfaces. The oscillator causes the fork 29 to oscillate at a frequency of, for example, 900 p/s.

The beam, modulated to the aforementioned frequency, is then passed from the fork 29 successively to the mirror 38, the mirror 39, the mirror 40 and the mirror 41 by forks 30, 31, 32 driven by oscillators 34, 35, 36 at forced oscillating frequencies $b$, $c$, $d$ against the rotating or fixed mirror or prism 42, to be then directed against the reflectors (not shown). The frequences, $b$, $c$, $d$ can be, for example, 600, 1,200 and 300 p/s.

According to the desired coding, combinations of the frequences can be employed to modulate the beam 13. In the illustrated embodiment all forks are shown to oscillate so that the beam is successively modulated with the frequencies $a - d$ and finally to obtain all said frequences ($a+b+c+d$). It is obvious the coded laser beams can be used for communicating with an aircraft both with landing and take-off. In this instane the aircraft should be provided with a receiver, e.g., having photocells which can receive the code frequency combination of reflection modulated laser beam 13.

The invention has been described with respect to special, non-restricted embodiments. It will readily be perceived that the navigation system of the present invention affords considerable improvements in such systems for approach and landing of aircraft, although these improvements can not be completely taken up in this application because of reasons of space. It will also be understood that the drawings only illustrate the principles of the navigation system in a very simplified form and that consequently one of normal skill in the art would have no difficulty in making various modifications within the scope of the invention.

I claim:

1. A navigation system for visually aiding a pilot in landing an aircraft, comprising a first array of laser beam reflecting screens located sequentially along a straight line pointing towards a runway, a second and a third array of laser beam reflecting screens located on the right hand and left hand side, respectively, of said runway and mutually converging towards said runway, means for generating stripshaped laser beams, means for sweeping a first laser beam in a vertical plane along said first array, means for sweeping second and third laser beams along said second and third arrays, respectively, and means for restricting the visibility of the beams reflected by said screens to predetermined angular sectors in the vertical and horizontal plane, respectively.

2. A navigation system according to claim 1, wherein said threee generated laser beams are beams of different colors.

* * * * *